3,649,487
PROCESS FOR THE RECOVERY, FROM SECONDARY MATERIAL, OF SUCH METALS AS NICKEL, COBALT, IRON AND COPPER, SAID SECONDARY MATERIAL COMPRISING IN ADDITION ONE OR MORE METALS HAVING A HIGH MELTING POINT

Alexander Iskander Aue, Gullspang, Gotthard E. Bjorling, Djursholm, and Sven Agden Johansson, Gullspang, Sweden, assignors to Gullspangs Elektrokemiska AB, Gullspang, Sweden
No Drawing. Filed Dec. 3, 1969, Ser. No. 881,876
Int. Cl. B01k 1/00; C22d 1/14, 1/16
U.S. Cl. 204—112                                6 Claims

ABSTRACT OF THE DISCLOSURE

In a process for the recovery of metals such as nickel, cobalt, iron or copper from secondary material, i.e. scrap, which in addition contains one or more metals having high melting-point, for instance chromium, molybdenum or tungsten the first step is to insure that the last mentioned metal is present in a combined or bound state in said secondary material. Therefore, when necessary the secondary material is pretreated by adding one or more non-metals belonging to any of the Groups III, IV or V in the periodic system in order to insure presence of said one or more metals bound preferably as a carbide, boride, silicide, nitride and/or phosphide. Anode plates are cast from the secondary material which anode plates are put in an electrolytic neutral or acid bath from metallic salts of acids having no oxidizing action. The voltage in the bath is kept so low, i.e. less than 4 v., that the carbides, silicides etc. from said one or more metals will not be dissolved or decomposed. When using granulated secondary material it can be carried in baskets or the like made of inert materials, for instance titanium. Between the electrodes there is put a diaphragm and a solution having composition other than the anolyte is used as a catholyte.

The technical development has during recent years brought forward frequent use of alloyed metallic materials having specific characteristics such as great strength at high temperatures, good ability to withstand corrosion, extraordinary magnetic properties, etc. These alloys as a rule comprise several metals such as nickel, cobalt, iron and copper, generally as a base metal and an admixture of one or more metals having a high melting point, i.e. mainly the heavy metals within the Groups IVa, Va, VIa and VIIa in the periodic system. As typical examples of such high-melting metals mention could be made of chromium, molybdenum and tungsten. In certain cases, for instance as regards hard carbide steel, some of the high-melting metals combined with a non-metallic substance may form the base material.

In order to be able to make use of the metal component in the secondary material in such alloys pure re-melting has often been practised whereafter in order to get the correct composition correction has been made simply by adding certain components. This process is, however, employable only when the secondary material which as a rule comprises scrap in pieces has a homogeneous composition of well-known analysis and has not been contaminated by machining, use or other way of handling. As these requirements seldom are fulfilled a re-melting in many cases will result in the material being lower classified.

Another known way of utilizing a secondary material is to use it as a dilution substance in certain alloys, primarily steel alloys. Then certain valuable components of the material will be lost as they either do not have any influence at all on steel or have an injurious effect thereon. By production of alloys for which very heavy demands are made secondary metals cannot be used. Instead, primary metal has to be considered in order to achieve safe control of all impurities present.

One object of the present invention is to make it possible wholly or partly to divide or separate secondary materials of the kind mentioned into their different constituents so that they can be used as components, pure metals or pre-alloys for the production of new alloys. Thereby it shall then be possible to adapt the degree of purity of the components to actual requirements at use. Further, the invention has to its object to make possible an entire utilization of secondary materials despite the degree of contamination, and a recovery of all such substances which might be profitable to take care of.

The invention principally resides in electrolytic dissolving and depositing of base metals, the process being handled so that presence of the high-melting metals in a combined state is secured. Then, they will not be dissolved but remain in the form of a metal product which can be treated separately. This intermediate product can comprise anode slime or a layer adhering to the anode, i.e. a skeleton. By adding non-metallic substances belonging to any of the Groups III, IV or V in the periodic system, preferably carbon and/or silicon it is possible to achieve a binding to the anode material of uncombined high-melting metal which by chance is present in the secondary material used. In case said metals already at the beginning are present in a combined state, preferably as a carbide, silicide, nitride and/or phosphide it may not be necessary to pretreat the secondary material in the way mentioned.

Such a binding of the high-melting metals ensures that said metals remain in the anode slime or skeleton. Thus, a distinguished separation between the high-melting metals and the base metals is achieved. By using a porous diaphragm it is also possible to take advantage of the electrolyte formed around the anode, i.e. the anolyte, and to let it be subject to a special purifying process, whereafter the purified solution is delivered as a catholyte to the surroundings of the cathode.

In practice a neutral or an acid electrolytic bath from metal salts not having oxidizing action is used and the voltage in the electrolyte is kept at a value below 4V. This will guarantee that the metals having high melting-point will be "locked in" at the anode, i.e. not dissolved or decomposed.

EXAMPLE 1

Scrap pieces from an alloy having nickel as base metal and comprising about 50% nickel and cobalt, about 20% chromium and about 5% molybdenum and about 5% tungsten is melted together with carbon, so that the carbon content will amount to about 3%. A substantial portion of the metals having high melting-point are thereby bound as carbides. The charge is cast into anodes which are electrolysed in a neutral or an acid bath. Then there is formed around the cathode an alloy comprising the base metals whereas the high-melting metals remain in a skeleton adhering to the anode. This skeleton comprises a substantial portion of chromium carbide having a certain percentage molybdenum carbide and tungsten carbide corresponding to the amounts of molybdenum and tungsten in the scrap material.

EXAMPLE 2

Scrap from hard-carbide steel in pieces or granulated form comprising between 60–80% tungsten as a carbide, 6–15% cobalt and certain smaller amounts of carbides from titanium, niobium and tantalum were electrolysed after having been put in a basket of titanium in a slight acid bath (pH about 4) whereby the cobalt is precipitated on the cathode and the carbides remain in an undissolved skeleton.

EXAMPLE 3

Scrap comprising an alloy having nickel as a base metal comprising about 60% nickel and cobalt, about 20% chromium, about 5% molybdenum, about 5% tungsten, about 3% aluminum, about 1.5% titanium and the rest iron is melted together with silicon so that the percentage of silicon will amount to about 7%. A substantial portion of the high-melting metals is thereby bound as silicides. The charge is cast into anodes and handled substantially as described in Example 1.

What we claim is:

1. A method for recovering nickel, cobalt or copper from scrap metal material that contains
    (a) at least one base metal selected from the group consisting of iron, nickel, cobalt, and copper, and
    (b) at least one high melting point metal selected from the group consisting of chromium, molybdenum and tungsten which comprises
    (1) pretreating the scrap metal material so that the high melting point metals set forth in (b) are bound as carbides, borides, silicides, nitrides and/or phosphides, and
    (2) forming a mass of said scrap metal material into an anode,
    (3) placing said anodes of scrap metal material in a neutral or acid electrolytic bath containing metal salts of an acid that does not have oxidizing action,
    (4) placing a cathode in the electrolytic system,
    (5) maintaining the voltage in the bath at a level less than about 4 volts,
    (6) depositing said base metal at said cathode, and
    (7) recovering said high melting point metal from the anode and anode slime.

2. A method according to claim 1 wherein the pretreating step (1) comprises adding one or more non-metals belonging to Group III, IV or V of the periodic system.

3. A method according to claim 1 wherein the forming step (2) involves casting.

4. A method according to claim 1 wherein the forming step (2) involves placing granulated scrap metal material in an inert basket.

5. A method according to claim 1 wherein said basket is made of titanium.

6. A method for recovering nickel, cobalt or copper from scrap metal material containing at least one base metal selected from the group consisting of iron, nickel, cobalt, and copper, and at least one high melting point metal selected from the group consisting of chromium, molybdenum and tungsten, said high melting point metal being bound as either carbides, borides, silicides, nitrides or phosphides, which method comprises forming a mass of said scrap metal material into an anode, placing said anode of scrap metal material in a neutral or acid electrolytic bath containing metal salts of an acid that does not have oxidizing action, placing a cathode in the electrolytic system, maintaining the voltage in the bath at a level less than about 4 volts, depositing said base metal at said cathode and recovering said high melting point metal from the anode and anode slime.

References Cited

UNITED STATES PATENTS

| 2,301,492 | 11/1942 | Young | 204—112 |
| 1,414,423 | 5/1922 | Langer | 204—112 |
| 1,462,421 | 7/1923 | Pearson et al. | 204—112 |
| 2,200,139 | 5/1940 | White | 204—106 |

FOREIGN PATENTS

| 588,711 | 5/1925 | France | 204—106 |

JOHN H. MACK, Primary Examiner

T. TUFARIELLO, Assistant Examiner

U.S. Cl. X.R.

204—106, 146